United States Patent [19]

Berenguer Barra et al.

[11] Patent Number: 5,319,075
[45] Date of Patent: Jun. 7, 1994

[54] IRON COMPLEXES AND MIXTURES OF IRON COMPLEXES OF DISAZO COMPOUNDS HAVING 1,3-DIHYDROXYBENZENE COUPLING COMPONENT RADICALS, THEIR USE AND METAL-FREE DISAZO COMPOUNDS USEFUL AS INTERMEDIATES

[75] Inventors: Jordi Berenguer Barra, Barcelona, Spain; Herbert Holliger, Allschwil, Switzerland; Jose Rocas Sorolla, Barcelona, Spain

[73] Assignee: Sandoz Ltd., Basel, Switzerland

[21] Appl. No.: 20,479

[22] Filed: Feb. 22, 1993

Related U.S. Application Data

[63] Continuation of Ser. No. 776,135, Oct. 15, 1991, abandoned.

[30] Foreign Application Priority Data

Oct. 15, 1990 [GB] United Kingdom ............... 9022354

[51] Int. Cl.$^5$ ............... C09B 33/04; C09B 45/32; C09B 67/22; D06P 3/32
[52] U.S. Cl. ............... 534/684; 534/688; 8/437; 8/639; 8/641; 8/681; 8/685; 8/919
[58] Field of Search ............... 534/684, 688; 8/437, 8/681, 685, 919, 639, 641

[56] References Cited

U.S. PATENT DOCUMENTS 5,104,979 4/1992 Hansen et al. ............... 534/684 X

FOREIGN PATENT DOCUMENTS 140252 1/1988 European Pat. Off. ............ 534/684

968247 9/1964 United Kingdom ............... 534/629

Primary Examiner—Mary C. Lee
Assistant Examiner—Fiona T. Powers
Attorney, Agent, or Firm—Robert S. Honor; Melvyn M. Kassenoff

[57] ABSTRACT

Mixtures of iron complexes of metallizable disazo compounds, at least one compound being of the formula

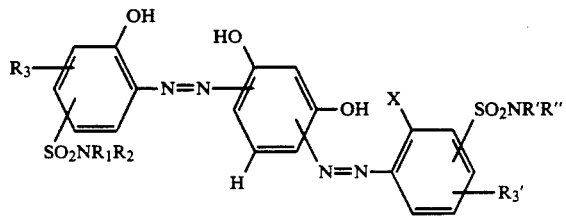

and at least one compound being of the formula

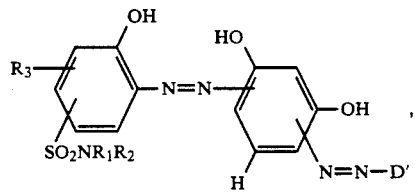

wherein the substituents have the meaning given in the specification, are useful for dyeing substrates dyeable with anionic dyes, e.g., leather.

20 Claims, No Drawings

IRON COMPLEXES AND MIXTURES OF IRON COMPLEXES OF DISAZO COMPOUNDS HAVING 1,3-DIHYDROXYBENZENE COUPLING COMPONENT RADICALS, THEIR USE AND METAL-FREE DISAZO COMPOUNDS USEFUL AS INTERMEDIATES

This is a continuation of application Ser. No. 07/776,135, filed Oct. 15, 1991, and now abandoned.

In the dyeing of leather it may be difficult to obtain level dyeings of good colour yield and penetration and further, especially with dyes of brown shades—mainly where these are multicomponent mixtures—, dyeings of very different hues may result on different leathers, in particular on leathers that have been pre-treated (e.g. tanned, retanned, filled, fat-liquored etc.) in different ways. Thus, with leathers of high affinity, where the colour yield may be good, it may be difficult to obtain level dyeings of good penetration. In order to obviate this difficulty there may be used levelling agents and penetration assistants, which, however, may lead to a loss of colour yield. With leathers of low affinity, e.g. vegetable tanned leather or retanned leather, while obtaining good penetration and levelness the coulour yield may not be satisfactory. Thus, even if a level dyeing of satisfactory penetration may be obtainable, there may still exist the problem of a too low colour yield of the dyeing.

It has now been found that the novel iron complexes mixtures described below solve these problems as they are suitable for obtaining level dyeings of satisfactory penetration and high colour yield, even without the use of any levelling agents or penetration assistants, and further that dyeings of the same or very similar shades are obtainable on different leathers.

The invention relates to the novel iron complex mixtures, their production and their use as brown dyes, in particular for the dyeing of leather.

The invention thus provides an iron-complex mixture of metallizable disazo compounds in which at least one complexant is a compound of the formula

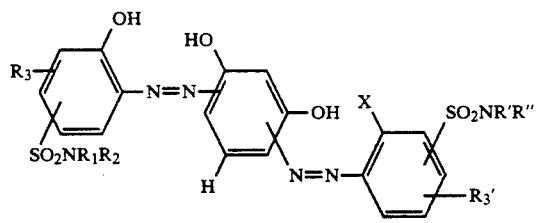

and at least one further complexant is a compound of the formula

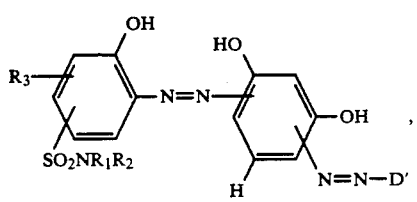

wherein $R_1$ signifies hydrogen, $C_{1-4}$-alkyl, $C_{2-4}$-hydroxyalkyl or methoxy-($C_{2-4}$-alkyl), $R_2$ signifies hydrogen, $C_{1-4}$-alkyl, $C_{2-4}$-hydroxyalkyl or methoxy-($C_{2-4}$-alkyl), or $R_1$ and $R_2$ together with the nitrogen to which they are linked form a saturated, nitrogen-containing, 5- or 6-membered heterocycle, $R_3$ signifies hydrogen, chlorine or $C_{1-2}$-alkyl, $R_3'$ signifies hydrogen, chlorine or $C_{1-2}$-alkyl, $R'$ signifies hydrogen, $C_{1-4}$-alkyl, $C_{2-4}$-hydroxyalkyl, methoxy-($C_{2-4}$-alkyl) or a radical of the formula

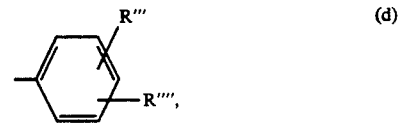

$R''$ signifies hydrogen, $C_{1-4}$-alkyl, $C_{2-4}$-hydroxyalkyl or methoxy-($C_{2-4}$-alkyl), or $R'$ and $R''$ together with the nitrogen to which they are linked form a saturated, nitrogen-containing, 5- or 6-membered heterocycle, $R'''$ signifies hydrogen, hydroxy, chlorine, $C_{1-2}$-alkyl or -alkoxy or $-SO_2NR_1R_2$, $R''''$ signifies hydrogen, $C_{1-2}$-alkyl or -alkoxy, trifluoromethyl, $-COOM$ or $-NR_o'R_o''$, $R_o'$ signifies hydrogen, $C_{1-4}$-alkyl, $C_{2-4}$-hydroxyalkyl, methoxy-($C_{2-4}$-alkyl) or carbamoyl-($C_{1-2}$-alkyl), $R_o''$ signifies hydrogen, $C_{1-4}$-alkyl, $C_{2-4}$-hydroxyalkyl, methoxy-($C_{2-4}$-alkyl) or carbamoyl-($C_{1-2}$-alkyl), or $R_o'$ and $R_o''$ together with the nitrogen to which they are linked form a saturated, nitrogen-containing, 5- or 6-membered heterocycle, X signifies hydrogen or hydroxy, D' signifies the radical of a mono- or dicyclic aromatic diazo component of the benzene series containing one $-SO_3M$ group and M signifies hydrogen or a cation.

The hydrogen in meta position to the two hydroxy groups of the resorcinol nucleus means that this position is unsubstituted.

In the significances of $R_1$, $R_2$, $R'$, $R''$, $R_o'$ and $R_o''$ $C_{1-4}$-alkyl may be linear or, where it contains 3 or 4 carbon atoms, also branched; preferred alkyl groups are methyl, ethyl, n-propyl and n-butyl. In the hydroxy- or methoxy-substituted $C_{2-4}$-alkyl radicals the hydroxy or methoxy group is preferably in one of the positions β to δ, representative hydroxyalkyl or methoxyalkyl groups being β-hydroxyethyl, β-hydroxypropyl and δ-hydroxybutyl and the analogous methoxy-substituted groups. Where $R_1$ and $R_2$ or $R'$ and $R''$ or $R_o'$ and $R_o''$ together with the respective nitrogen atom, to which they are linked, form a saturated 5- or 6-membered heterocycle, this is preferably pyrrolidino, morpholino or piperidino. $R'''$ preferably is hydrogen, chlorine or $-SO_2NR_1R_2$; $R''''$ preferably is hydrogen, methyl, methoxy or $-COOM$. Where more than one group $-SO_2NR_1R_2$ is present in the molecule of formula (Ia) these groups may have the same significance or different significances. $R_1$ preferably signifies hydrogen, methyl, ethyl or γ-methoxypropyl; $R'$ preferably signifies hydrogen, methyl, ethyl, γ-methoxypropyl, phenyl or carboxyphenyl; preferred significances of $R_2$ and $R''$ are, independently from each other, hydrogen, methyl or ethyl, most preferably hydrogen; $R'$ and $R''$ most preferably signify hydrogen. The group $-SO_2NR_1R_2$ and the group $-SO_2NR'R''$, independently from each other, preferably are in one of the positions meta and para to the respective azo or $-NR''-$ groups to which the respective benzene rings are bound. If $R_3$ or $R_3'$ signify chlorine or $C_{1-2}$-alkyl this may be in any of the available positions ortho, meta or para to the respective azo group; most preferably each of $R_3$ and $R_3'$ signifies hydrogen.

M may be hydrogen or any cation conventional in carboxy or sulpho group-containing metal complex dyes, preferably unsubstituted or substituted ammonium (in particular ammonium substituted with $C_{1-4}$-alkyl and/or with $\beta$-hydroxy-$C_{2-3}$-alkyl, preferably mono-, di- or triethanol- or -isopropanolammonium), alkaline earth metal (in particular magnesium) or alkali metal (in particular lithium, sodium or potassium) of which potassium and especially sodium are preferred.

D' preferably is a radical of the formula

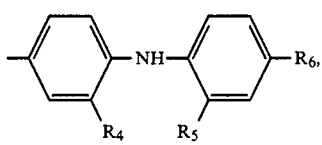
(b₁)

wherein
$R^4$ signifies hydrogen, —SO₃M or —SO₂NR₁R₂, $R_5$ signifies hydrogen, methoxy, —NO₂ or —SO₃M and $R_6$ signifies hydrogen, methoxy, —NO₂ or —SO₃M, at least one of $R_4$, $R_5$ and $R_6$ being hydrogen and at least one of $R_4$, $R_5$ and $R_6$ being other than hydrogen, methoxy and —NO₂,
and/or of the formula

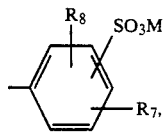
(b₂)

wherein
$R_7$ signifies hydrogen, $C_{1-2}$-alkyl or -alkoxy or —NO₂ and $R_8$ signifies hydrogen, chlorine or $C_{1-2}$-alkyl.

If in formula (b₁) $R_4$ signifies hydrogen, one of $R_5$ and $R_6$ preferably signifies —NO₂ and the other —SO₃M. If $R_4$ signifies —SO₃M or —SO₂NR₁R₂, preferably one of $R_5$ and $R_6$ signifies hydrogen and the other signifies methoxy or hydrogen; more preferably $R_5$ and $R_6$ signify hydrogen. Most preferably $R_5$ and $R_6$ signify hydrogen and $R_4$ signifies —SO₃M.

In formula (b₂) $R_7$ preferably signifies hydrogen, methyl, methoxy or the nitro group, advantageously hydrogen or —NO₂, most preferably hydrogen. $R_8$ preferably signifies hydrogen, chlorine or methyl, most preferably hydrogen. If $R_7$ and/or $R_8$ are other than hydrogen they can be in any of the available positions. If $R_7$ signifies —NO₂ this is preferably in one of the positions meta and para to the azo-group and the sulpho-group is preferably in one of the available positions meta and para to the nitro-group. If $R_7$ is other than —NO₂ the sulpho group in formula (b₂) is preferably in one of the positions meta and para to the azo group;

Preferably at least one complexant of formula (Ib) is a compound of the formula

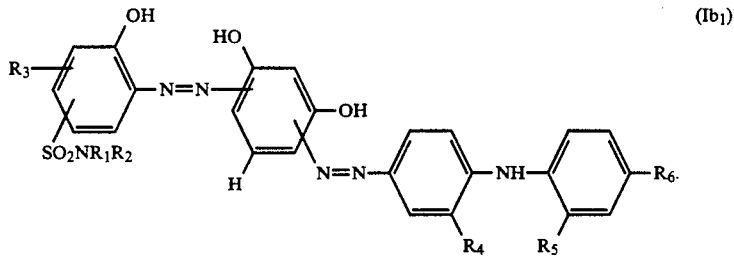
(Ib₁)

A particular further aspect of the invention is represented by mixed iron complexes, in which at least one complexant corresponds to formula (Ia), at least one complexant corresponds to formula (Ib₁) and at least one further complexant corresponds to formula

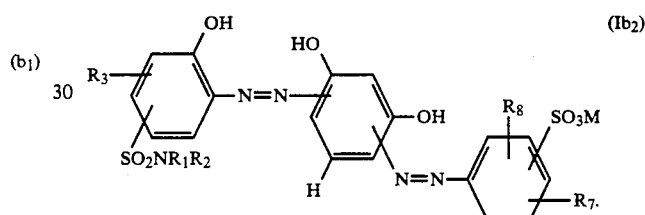
(Ib₂)

The iron-complexes of the invention may be synthesized analogously to known methods, namely by diazotization, coupling and metallization reactions, in particular
either
(α) by metallizing at least one complexant of formula (Ia) as defined above and at least one complexant of formula (Ib) as defined above [preferably at least one compound of formula (Ib₁) as defined above and optionally at least one compound of formula (Ib₂) as defined above] with an iron-yielding compound
or (β) by coupling the diazo compound(s) of at least one amino compound of the formula

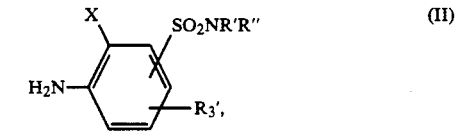
(II)

and the diazo compound(s) of at least one further aromatic amine of the formula D'—NH₂ [preferably of at least one amine of the formula

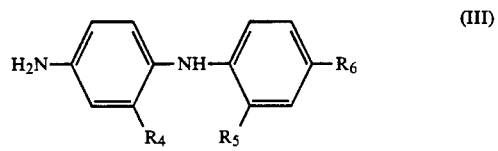
(III)

and optionally of the at least one amine of formula

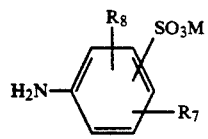

(IV)

to a 1:2-iron complex of a monoazo compound of the formula

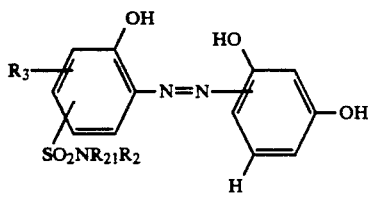

(V)

or to a mixture thereof.

The compounds of formula (Ia) may be synthesized by coupling the diazo compound of an amine of formula (II) to a monoazocompound of formula (V).

The compounds of formula (Ib) may be synthesized by coupling the diazo compound of at least one amine of formula D'—NH$_2$ to a monoazocompound of formula (V).

The compounds of formula (V) may be synthesized by coupling the diazo compound of an amine of formula

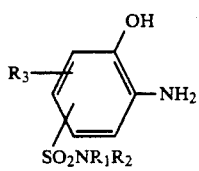

(VI)

to resorcinol. The coupling of the diazo compound of an amine of formula (VI) to resorcinol may take place in any of the positions ortho and para to the hydroxy groups, preferably or mainly in para-position to a hydroxy group.

The 1:2-iron-complexes of the monoazo compound of formula (V) may be represented by the following formula

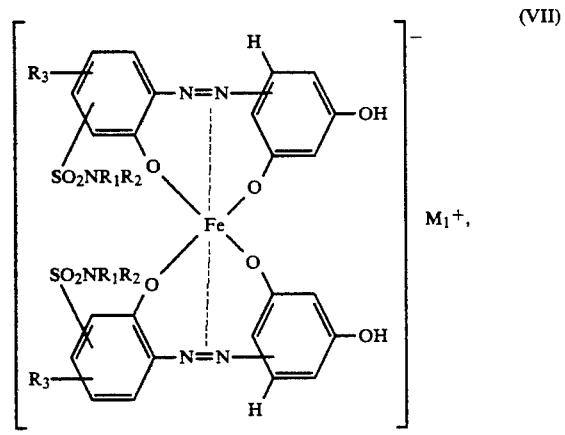

(VII)

wherein M$_1$ is hydrogen or a cation.

The iron complex mixtures of the invention that are produced by variant ($\beta$) or in which X is hydrogen are in general 1:2-Fe-complexes and may be represented by the following general formula

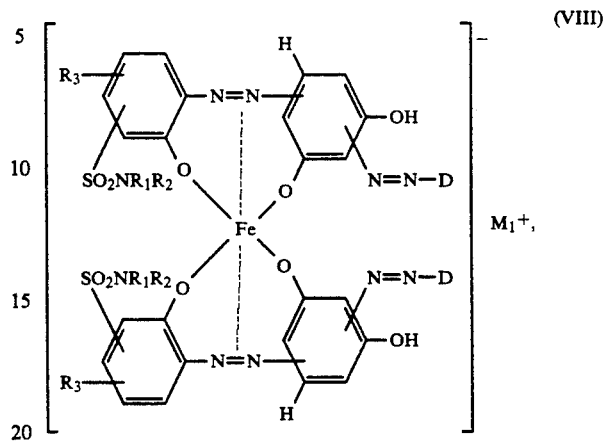

(VIII)

wherein at least some of the radicals —D are radicals of formula

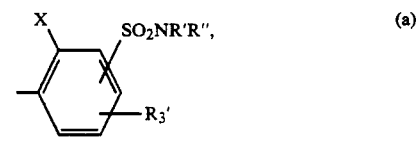

(a)

any further radicals —D being the radicals of another diazo component —D' preferably of formula (b$_1$) and optionally (b$_2$).

The azo groups co-ordinatively bound to Fe are linked to the resorcinol nucleus at one of the positions ortho to the Fe-bound oxygen.

If X is hydroxy and the Fe-complexes are produced by variant ($\alpha$) a further Fe-complex-formation takes place at this hydroxy group together with the azo-group in ortho to this X and the other available hydroxy group of the resorcinol radical in ortho to this azo-group. Thus the Fe-complexes of the invention comprise in particular such complexes in which the ratio of Fe to the Fe-linked complexant-radicals is 1:2 or more than 1:2 (e.g. up to 2:3) depending on the number of metallizable sites in the complex-forming disazo compounds and also on the employed quantity of iron-yielding compound.

M$_1$+ may be hydrogen (e.g. in the form of a hydroxonium ion) or a cation, e.g. as indicated for M above. M$_1$+ is preferably a cation, in particular if the molecule contains at least one sulpho or carboxy group.

The involved reactions for the synthesis of the iron-complexes mixtures of the invention may be carried out in a manner known per se. Thus, the coupling of the diazo compound of an amine of formula (VI) to resorcinol may be carried out under basic conditions, suitably in aqueous medium at pH-values of at least 7.5 (principally in the range of 8 to 14) and under mild temperature conditions, preferably in the range of $-5°$ C. to $+25°$ C., more preferably in the range of 0° to 20° C.; the pH-value may be adjusted by addition of a suitable base, preferably alkali metal hydroxides or carbonates, ammonia or an amine. If in the final product R$_o$' and R$_o$" signify hydrogen, the corresponding acylated, preferably acetylated, amine derivative may be used; after completion of the coupling reactions the acylamino group may be hydrolyzed to the primary amino group, e.g. by heating under alkaline conditions. The diazocomponents [i.e. diazo compounds of amines of formulae (II) and D'—NH$_2$, in particular (III) and optionally (IV)] may be coupled sequentially or in admixture with each other. Preferably the coupling reactions are at least in part carried out sequentially, in any desired order. The coupling of the diazo compound of an amine of formulae (II) to a compound of formula (V) or to a 1:2-iron-complex thereof [in particular corresponding to formula (VII)] may be carried out in a similar or even in the same temperature range as the first coupling, advantageously in aqueous medium and at pH-values preferably $\geq 5$, in particular in the range of 5 to 12, more preferably at pH-values in the range of 7 to 11. If formulae (II) and (VI) have the same significance the coupling of the diazocompounds of these amines to resorcinol may be carried out together in one sequence. The coupling of a diazo compound of an amine of formula (III) may be carried out in a similar or even in the same temperature range as for the diazo compound of an amine of formula (II), preferably in aqueous medium and at pH values preferably in the range of 9.5 to 14. The coupling of the diazo compound of an amine of formula (IV) may be carried out in a similar or even in the same temperature range as the other coupling reactions mentioned above, preferably in aqueous medium and at pH values preferably in the range of 7.5 to 14, more preferably 8 to 12. If desired, the coupling reactions may be catalyzed by addition of conventional coupling accelerators. The setting of acidic conditions may be done in conventional manner, suitably by addition of an acid, e.g. a mineral acid (preferably sulphuric or hydrochloric acid) or a low molecular aliphatic acid (preferably formic or acetic acid).

The metallization of monoazo compounds of formula (V) or diazo compounds of formula (Ia) and (Ib), in particular of formula (Ib$_1$) and optionally (Ib$_2$), to the corresponding iron-complexes, mainly 1:2-iron-complexes, may be carried out in conventional manner, employing conventional iron-compounds, e.g. ferrous or ferric acetate or iron salts of inorganic acids, e.g. ferrous sulphate, ferric sulphate, ferrous nitrate, ferric nitrate or iron trichloride, suitably in aqueous medium, advantageously at pH-values in the range of 3.5 to 6.5, preferably 4 to 6, with heating. Preferably the metallization is carried out at temperatures in the range of 40° C. to reflux temperature, preferably 60° to 100° C. If desired, the pH of the reaction mixture may, after completion of the coupling and metallization reactions, be increased by addition of a suitable base for more convenient dyestuff isolation and/or salt formation. The obtained dye may be isolated from the reaction mixture in conventional way e.g. by salting out and filtration.

The molar ratio of amines of formula (II) to amines of the formula D'—NH$_2$ [in particular of formula (III) and/or (IV)] is preferably in the range of 1:10 to 10:1, more preferably 1:3 to 3:1, the diazo compounds of formulae (Ia) and (Ib), in particular (Ib$_1$) and/or (Ib$_2$), being present in the Fe-complexes as Fe-bound ligand-radicals in corresponding amounts. According to a preferred aspect of the invention there are employed amines of formula (II) and of formula (III) so that in the final iron-complex mixtures both radicals (a) and (b$_1$), respectively both complexants (Ia) and (Ib$_1$) in the form of Fe-bound ligand radicals, are present. At least one radical of formula (b$_2$) is preferably also present respectively at least one complexant of formula (Ib$_2$) is present as an Fe-bound ligand-radical in the iron-complex mixture. If (b$_2$) is present, respectively if the diazo compounds of amines of formula (IV) are also employed, the molar ratio of amines of formula (IV) to the other ones [of formula (II) and D'—NH$_2$, in particular of formula (II) and of formula (III)] is preferably in the range of 1:10 to 4:1, preferably 1:5 to 3:1. The molar ratio of the amines of formulae (II):(III):(IV) [and analogously of the complexants of formulae (Ia):(Ib$_1$):(Ib$_2$)] is preferably in the range of (0.1 to 0.7):(0.1 to 0.8):(0.0 to 0.5), more preferably in the range of (0.2 to 0.5):(0.3 to 0.5):(0.1 to 0.4), the sum totalling 1.0. If X signifies hydroxy the molar ratio of the corresponding amine of formula (II) to the total of the amines of formula D'—NH$_2$+(II) respectively of the corresponding component (Ia) to the total of the complexants of formula (Ia)+(Ib) is preferably $\leq 0.4$.

The diazo compounds of amines of formulae (VI), (II) and/or D'—NH$_2$, in particular (III) and (IV), are preferably used in excess over the stoichiometric quantity, e.g. in an excess of up to 30 mol-%, preferably 10 to 30 mol-%. As stoichiometric quantity there is intended a total of 2 moles of amine(s) of formula D'—NH$_2$+formula (II)+formula (VI) per mole of resorcinol, or a total of 1 mole of amine(s) of formula D'—NH$_2$+formula (II) per mole of resorcinol, as would be stoichiometrically required for the obtention of 1 mole of a mixture of diazo compound(s) of formula (Ia) and (Ib). Where an excess of diazo compounds is used a minor amount of resorcinol (e.g. 2 to 30 mol-% of the first quantity of resorcinol, depending on the excess the diazo compounds) may be added when the disazodyes of formula (I) have at least in part been formed and preferably before the last coupling with the diazo compound of an amine of formula (III), in order to couple any still available diazo compound and to take part in the coupling with the last diazo compound, so that the mixture may contain also some non-metallizable mono- or disazo dye. The resulting disazo compounds of formula (Ia) and (Ib) may contain in the reaction mixture some non-reacted monoazo dye, some non-coupled diazo components and/or their decomposition products, some disazo dye in which resorcinol is coupled twice with the disazo compounds of the amine of formula (VI) and some trisazo dye as by-products, and similarly the iron-complex mixtures of the invention may contain as by-products some iron-complexes containing monoazo dye as complexant and some iron-complexes containing trisazo dye as a complexant. Most of the by-products (mainly decomposition products of non-coupled diazo compounds and some non-metallized complexant) may be eliminated when isolating the dye e.g. by salting out and filtration. By-products as mentioned may be present e.g. in an amount of up to 10% by weight, preferably up to 5% by weight of the final dye. If desired the obtained dyes may be (further) purified in order to eliminate any undesired by-product. The presence of the indicated amounts of by-products may be tolerated and a purification of the dye, although possible, is not necessary.

The iron-complex mixtures of the invention are readily hydrosoluble and serve as anionic dyes; they are suitable for the dyeing of substrates dyeable with anionic dyes. They may be used in the form as has been synthesized and, if necessary, purified or even be blended with conventional blending agents (in particular with inorganic salts, preferably sodium carbonate, sulphate or chloride, with non-electrolyte blending agents, preferably dextrine and/or urea and optionally—for the production of granular or liquid forms—with corresponding suitable additives). The dyes may be used in any conventional form, e.g. as powder, liquid compositions or granules; for the production of especially electrolyte-poor compositions, the dyes may be purified, e.g. by dialysis, before any blending with non-electrolyte blending agents.

Any substrate that is dyeable with anionic dyes is suitable as a substrate that may be dyed with the iron complex mixtures of the invention; these include natural and regenerated cellulose, polyurethanes, basically modified high polymers (e.g. basically modified polypropylene), natural or synthetic polyamides or anodized aluminum, in particular, however, leather substrates. The substrate to be dyed may be in any conventional form, e.g. in the form of loose fibres, filaments, yarns, woven or knitted goods, non-woven webs, carpets, half-ready-made and ready-made soft goods and tanned leather or pelts. The dyes may be employed in any desired concentration up to the saturation of the substrate. The dyeing may be carried out by any conventional methods that are suitable for the substrate to be dyed, e.g. by exhaustion or impregnation methods (e.g. padding or printing), preferably from aqueous medium; for synthetic substrates, the dye may optionally also be incorporated into the synthetic mass. Paper may be dyed in the pulp or after sheet formation.

The dyes of the invention are, however, mainly suitable for the dyeing of leather and pelts.

Any kinds of leather which are conventionally dyed from aqueous medium are suitable, particularly grain leather (e.g. nappa from sheep, goat or cow and box-leather from calf or cow), suede leather (e.g. velours from sheep, goat or calf and hunting leather), split velours (e.g. from cow or calf skin), buckskin and nubuk leather; further also wool-bearing skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If desired, the leather may also be re-tanned; for re-tanning there may be used any tanning agent, conventionally employed for re-tanning, e.g. mineral, vegetable or synthetic tanning agents [e.g. chromium, zirconyl or aluminum derivatives, oak, quebracho, chestnut or mimosa extracts, aromatic syntans, polyurethanes, (co)polymers of (meth)acrylic acid compounds or melamine/, dicyanodiamide/ and/or urea/-formaldehyde resins]. Thus leathers of very high to very low affinity for anionic dyes may be used.

The leathers may be of various thicknesses, thus, there may be used very thin leathers, such as book-binder's leather or glove-leather (nappa), leather of medium thickness, such as shoe upper leather, garment leather and leather for handbags, or also thick leathers, such as shoe-sole leather, furniture leather and leather for suitcases, for belts and sport articles; hear-bearing leathers and furs may also be used. After tanning (in particular after a re-tanning) and before dyeing, the pH of the leather is advantageously set to values in the range of 4 to 8 (the leather is "neutralized"); depending on the kind of the leather, there may be chosen an optimum pH range, e.g. for grain leather pH values in the range of 4 to 6, for suede leather and split velours and for very thin leathers pH-values in the range of 4.5 to 8 and for intermediately dried suede leathers and intermediately dried split velours the pH may range in the range of 5 to 8. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium bisulfite, of which sodium formate and ammonia are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, in particular in the temperature range of 20° to 80° C., preferably 25° to 70° C., milder temperature conditions, in particular in the range of 25° to 40° C., being preferred for the achievement of deeper penetrations and for the dyeing of wool-bearing skins and furs. The pH-values of the dyebath may, in general, range broadly, mainly from pH 8 to pH 3; in general the dyeing may be advantageously begun at higher pH-values and concluded at lower pH-values. Preferably the dyeing is carried out at pH-values $\geq 4$, in particular in the range of 8 to 4, and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants.

Since the dyes of the invention have excellent levelling properties even on leathers of high affinity for anionic dyes, it is in general not necessary to employ any dyeing assistants. The dyes of the invention are, however, also compatible with dyeing assistants and may, if desired, be employed in combination with conventional dyeing assistants, mainly non-ionic or anionic products (in particular surfactants, preferably hydrophilic polysaccharide derivatives, polyoxyethylated alkylphenols or alcohols, lignosulphonates or sulpho group-containing aromatic compounds).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil, wax, resin or resin-oil or chemically modified animal or vegetable fat or oil, which include in particular tallow, fish oils, neats-foot oil, olive oil, castor oil, rapeseed oil, linseed oil, wood oil, cottonseed oil, sesame oil, corn oil and Japanese tallow and chemically modified products thereof (e.g. hydrolysis, transesterification, oxidation, hydrogenation or sulphonation products), bees-wax, chinese wax, carnauba wax, montan wax, wool fat, colophony, birch oil, shellack, mineral oils boiling range the within 300° to 370° C. (particularly the so-called "heavy alkylates"), soft paraffin, medium paraffin, hard paraffin, vaseline, ceresin and methyl esters of $C_{14-22}$-fatty acids; and synthetic leather fatting agents, including esters, in particular partial esters of polybasic acids (e.g. phosphoric acid) with optionally oxyethylated fatty alcohols. Of the above mentioned the methyl ester, the sulphonation products and the phosphoric acid partial esters are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener may, if desired, be applied in a final step, particularly if fatting has been carried out with a sulphonated fat-liquoring agent.

The treated substrate may then be further treated in conventional manner, e.g. rinsed or washed, drained, dried and cured.

The iron complex dyes of the invention are, especially in the form of their alkali metal salts, readily soluble in water, display a surprisingly good stability to electrolytes (in particular inorganic ions), specifically also to bases and acids, and are distinguished especially on leather by their good build-up and a high degree of insensitivity to variations of the affinity of the leather towards anionic dyes, very level dyeings of outstanding penetration and high colour-yield being obtainable. The dyeings, particularly on leather, have excellent fastness properties, for example wet-fastnesses, fastness to rubbing, fastness to acids, light-fastness and [especially the dyeings obtained with Fe-complex mixtures of the dyes of formulae (Ia), (Ib$_1$) and (Ib$_2$)] stability to PVC-migration. They are readily combinable with other anionic dyes, in particular such with similar tinctorial behaviour. There may be obtained very level, deep, fine, dyeings, grain side and velours side being very evenly dyed, the shade of the dyeings on different kinds of leather being equal or very similar; in admixture with corresponding dyes with which the dyes of the invention are combinable, there may also be obtained very deep and regular dyeings of high yield and optimum fastnesses.

In the following examples percentages are by weight and the temperatures are indicated in degrees Celsius. In the dyeing Examples the percentages refer to the wet weight of the substrate, if not otherwise indicated and if they do not clearly refer to a concentration.

EXAMPLE 1 a) 10.1 g of 1-amino-2-hydroxybenzene-5-(N-methyl)-sulphonamide are diazotized in conventional manner in aqueous medium with $NaNO_2$ and hydrochloric acid and coupled at pH 9.5 and at a temperature of 0°–3° C. with 5.5 g of 1,3-dihydroxybenzene dissolved in 100 ml of ice/water, the pH of 9.5 being adjusted by addition of aqueous 30% sodium hydroxide solution. 1.9 g of 4-aminobenzenesulphonamide are diazotized in conventional manner in aqueous medium with $NaNO_2$ and hydrochloric acid and coupled with the previous monoazoic dyestuff at pH 9 and at a temperature of 2°–3° C. during 2½ hours. 2.78 g of 4-amino-1,1'-diphenylamine-2-sulphonic acid are diazotized in conventional manner in aqueous medium with $NaNO_2$ and hydrochloric acid and then coupled with the previously prepared mixture at the same conditions (pH 9, and 2°–3° C.), during 15 hours (suitably overnight). Finally, 7.61 g of 3-aminobenzenesulphonic acid are diazotized in conventional manner in aqueous medium with $NaNO_2$ and hydrochloric acid and coupled with the previous suspension at pH=11.5 and temperature 2°–3° C., during 1 hour.

b) The obtained suspension is stirred for two hours and then heated to 60° C. The pH is adjusted to 5–5.5 with hydrochloric acid and then 8.7 g of crystallized ferrous sulphate ($FeSO_4.7H_2O$) are added. The mixture is stirred at 75° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLE 2 a) 10.1 g of 1-amino-2-hydroxybenzene-5-(N-methyl)-sulphonamide are diazotized in conventional manner in aqueous medium with $NaNO_2$ and hydrochloric acid and coupled at pH 9.5 and at a temperature of 0°–3° C. with 5.5 g of 1,3-dihydroxybenzene dissolved in 100 ml of ice/water, the pH of 9.5 being adjusted by addition of aqueous 30% sodium hydroxide solution. 3.46 g of 3-aminobenzenesulphonic acid are diazotized in conventional manner in aqueous medium with $NaNO_2$ and hydrochloric acid and coupled with the previous monoazoic dyestuff at pH 9 and at a temperature of 2°–3° C. during 2½ hours. 4.62 g of 4-amino-1,1'-diphenylamine-2-sulphonic acid are diazotized in conventional manner in aqueous medium with $NaNO_2$ and hydrochloric acid and then coupled with the previously prepared mixture at the same conditions (pH 9, and 2°–3° C.), during 15 hours (suitably overnight). Finally, 4.73 g of 4-aminobenzenesulphonamide are diazotized in conventional manner in aqueous medium with $NaNO_2$ and hydrochloric acid and coupled with the previous suspension at pH 8 and temperature 20° C., during 1 hour.

b) The obtained suspension is stirred for two hours and then heated to 60° C. The pH is adjusted to 5–5.5 with hydrocholoric acid and then 8.7 g of crystallized ferrous sulphate ($FeSO_4.7H_2O$) are added. The mixture is stirred at 75° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLE 3 a) 10.1 g of 1-amino-2-hydroxybenzene-5-(N-methyl)-sulphonamide are diazotized in conventional manner in aqueous medium with $NaNO_2$ and hydrochloric acid and coupled at pH 9.5 and at a temperature of 0°–3° C. with 5.5 g of 1,3-dihydroxybenzene dissolved in 100 ml of ice/water, the pH of 9.5 being adjusted by addition of aqueous 30% sodium hydroxide solution. 3.87 g of 4-aminobenzenesulphonamide are diazotized in conventional manner in aqueous medium with $NaNO_2$ and hydrochloric acid and coupled with the previous monoazoic dyestuff at pH 9 and at a temperature of 2°–3° C. during 2½ hours. 11.09 g of 4-amino-1,1'-diphenylamine-2-sulphonic acid are diazotized in conventional manner in aqueous medium with $NaNO_2$ and hydrochloric acid and then coupled with the previously prepared mixture at the same conditions (pH 9, and 2°–3° C.), during 15 hours (suitably overnight).

b) The obtained suspension is stirred for two hours and then heated to 60° C. The pH is adjusted to 5-4.5 with hydrochloric acid and then 8.7 g of crystallized ferrous sulphate (FeSO$_4$.7H$_2$O) are added. The mixture is stirred at 75° C. during two hours, maintaining the pH at 4.0-4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLE 4 a) 10.1 g of 1-amino-2-hydroxybenzene-5-(N-methyl)-sulphonamide are diazotized in conventional manner in aqueous medium with NaNO$_2$ and hydrochloric acid and coupled at pH 9.5 and at a temperature of 0°-3° C. with 5.5 g of 1,3-dihydroxybenzene dissolved in 100 ml of ice/water, the pH of 9.5 being adjusted by addition of aqueous 30% sodium hydroxide solution. 7.26 g of 4-amino-1,1'-diphenylamine-2-sulphonic acid are diazotized in conventional manner in aqueous medium with NaNO$_2$ and hydrochloric acid and then coupled with the previously prepared mixture at pH 9 and at a temperature of 2°-3° C., during 2.5 hours. 6.45 g of 4-aminobenzenesulphonamide are diazotized in conventional manner in aqueous medium with NaNO$_2$ and hydrochloric acid and coupled with the previous suspension at pH 9 and temperature of 2°-3° C., during 15 hours (suitably overnight).

b) The obtained suspension is stirred for two hours and then heated to 60° C. The pH is adjusted to 5-5.5 with hydrochloric acid and then 8.7 g of crystallized ferrous sulphate (FeSO$_4$.7H$_2$O) are added. The mixture is stirred at 80° C. during two hours, maintaining the pH at 4.0-4.5 by addition of aqueous 30% sodium hydroxide solution. After the metallization the product is precipitated by addition of sodium chloride, filtered at 60° C. and dried. The product dissolves easily in water and dyes leather in a yellowish brown shade.

EXAMPLE 5

The procedure of Example 3 is repeated with the difference that 0.035 moles of 4-aminobenzenesulphonamide are used in place of 0.0225 moles, and 0.03 moles 4-amino-1,1'-diphenylamine-2-sulphonic acid are used in place of 0.0425 moles.

EXAMPLE 6

The procedure of Example 4 is repeated with the difference that 0.015 moles of 4-amino-1,1'-diphenylamine-2-sulphonic acid are used in place of 0.0275 moles, and 0.03 moles 4-aminobenzenesulphonamide are used in place of 0.0375 moles.

EXAMPLE 7

The procedure of Example 6 is repeated with the difference that 0.01 moles of 4-amino-1,1'-diphenylamine-2-sulphonic acid are used in place of 0.015 moles, and 0.055 moles 4-aminobenzenesulphonamide are used in place of 0.05 moles.

EXAMPLE 8

The procedure of Example 5 is repeated with the difference that 0.04 moles of 4-aminobenzenesulphonamide are used in place of 0.035 moles, and 0.025 moles 4-amino-1,1'-diphenylamine-2-sulphonic acid are used in place of 0.03 moles.

EXAMPLES 1BIS TO 8BIS

The procedures of Examples 1 to 8 are repeated with the difference that in step b) instead of the crystallized ferrous sulphate there is employed the equivalent amount of iron trichloride. The obtained dyes have the same properties as the respective dyes of Examples 1 to 8.

EXAMPLE 9

The procedure of Example 1 is repeated with the difference there are used 26.4 g (0.122 moles) of 1-amino-2-hydroxybenzene-5-(N-methyl)sulphonamide, 11 g (0.1 moles) of resorcinol, 5.07 g (0.0295 moles) of 4-aminobenzenesulphonamide, 6.8 g (0.0258 moles) of 4-amino-1,1'-diphenylamine-2-sulphonic acid, 9.48 g (0.0548 moles) of 3-aminobenzenesulphonic acid and 21.87 g of aqueous 40% iron trichloride (0.058 moles).

The disazo dye Fe-complexes obtained according to the above Examples 1 to 9 contain the Fe-bound radicals of disazocompounds of formulae (Ia) and (Ib$_1$) and, according to Examples 1, 2, 1bis, 2bis and 9, also of formula (Ib$_2$), in which R$_1$ is methyl, R$_2$, R', R'', R$_3$, R$_3$', R$_5$, R$_6$, R$_7$ and R$_8$ are hydrogen, R$_4$ is a sulpho group, the group —SO$_2$N(H)CH$_3$ is in para position to the hydroxy group and the sulpho group is in meta position to the azo group, mainly as represented by formula (VIII) in the corresponding partial Na-salt form.

The following table contains further examples of iron complex mixtures of the invention, obtainable analogously as described in the above Examples 1 to 8 and 1bis to 8bis, employing the amines of formulae (II), (III), (IV) and (VI) as indicated in the table, the last column of the table indicating the molar proportion of the employed amines and the synthetic method used (with particular reference to the sequence of the coupling reactions). All the dyes of the table dye leather in yellowish-brown shades.

TABLE

| Example number | Amine of formula (VI) | Amine of formula (II) | Amine of formula (III) | Amine of formula (IV) | Method and molar ratios as in step a) of ex. |
|---|---|---|---|---|---|
| 10.1 and 10.2 | 1-Amino-2-hydroxybenzene-5-sulphonamide | 4-Aminobenzene-sulphonamide | 4-Amino-1,1'-diphenylamine-2-sulphonic acid | 3-Aminobenzene-sulphonic acid | 1 and 2 |
| 10.3 to 10.8 | 1-Amino-2-hydroxybenzene-5-sulphonamide | 4-Aminobenzene-sulphonamide | 4-Amino-1,1'-diphenylamine-2-sulphonic acid | — | 3, 4, 5, 6, 7 and 8 |
| 11.1 and 11.2 | 1-Amino-2-hydroxybenzene-5-[N-($\nu$-methoxypropyl)]sulphonamide | 4-Aminobenzene-sulphonamide | 4-Amino-1,1'-diphenylamine-2-sulphonic acid | 3-Aminobenzene-sulphonic acid | 1 and 2 |
| 11.3 to 11.8 | 1-Amino-2-hydroxybenzene-5-[N-($\nu$-methoxypropyl)]sulphonamide | 4-Aminobenzene-sulphonamide | 4-Amino-1,1'-diphenylamine-2-sulphonic acid | — | 3, 4, 5, 6, 7 and 8 |
| 12 | 1-Amino-2-hydroxybenzene-5- | 4-Aminobenzene- | 4-Amino-1,1'-di- | 3-Aminobenzene- | 1 |

TABLE -continued

| Example number | Amine of formula (VI) | Amine of formula (II) | Amine of formula (III) | Amine of formula (IV) | Method and molar ratios as in step a) of ex. |
|---|---|---|---|---|---|
| | (N,N-diethyl)sulphonamide) | sulphonamide | phenylamine-2-sulphonic acid | sulphonic acid | |
| 13 | 1-Amino-2-hydroxybenzene-5-(N-ethyl)sulphonamide | 4-Aminobenzene-sulphonamide | 4-Amino-1,1'-diphenylamine-2-sulphonic acid | 3-Aminobenzene-sulphonic acid | 1 |
| 14 | 1-Amino-2-hydroxybenzene-5-(N-propyl)sulphonamide | 4-Aminobenzene-sulphonamide | 4-Amino-1,1'-diphenylamine-2-sulphonic acid | 3-Aminobenzene-sulphonic acid | 1 |
| 15 | 1-Amino-2-hydroxybenzene-5-[N-(β-methoxyethyl)]sulphonamide | 4-Aminobenzene-sulphonamide | 4-Amino-1,1'-diphenylamine-2-sulphonic acid | 3-Aminobenzene-sulphonic acid | 1 |
| 16 | 1-Amino-2-hydroxybenzene-5-(N,N-dipropyl)sulphonamide | 4-Aminobenzene-sulphonamide | 4-Amino-1,1'-diphenylamine-2-sulphonic acid | 3-Aminobenzene-sulphonic acid | 1 |
| 17 | 1-Amino-2-hydroxybenzene-5-[N,N-di(ν-methoxypropyl)-sulphonamide | 4-Aminobenzene-sulphonamide | 4-Amino-1,1'-diphenylamine-2-sulphonic acid | 3-Aminobenzene-sulphonic acid | 1 |
| 18 | 1-Amino-2-hydroxybenzene-5-[N,N-di(β-methoxyethyl)]-sulphonamide | 4-Aminobenzene-sulphonamide | 4-Amino-1,1'-diphenylamine-2-sulphonic acid | 3-Aminobenzene-sulphonic acid | 1 |
| 19 | 1-Amino-2-hydroxybenzene-5-(N-butyl)sulphonamide | 4-Aminobenzene-sulphonamide | 4-Amino-1,1'-diphenylamine-2-sulphonic acid | 3-Aminobenzene-sulphonic acid | 1 |
| 20 | 1-Amino-2-hydroxybenzene-5-(N,N-dibutyl)sulphonamide | 4-Aminobenzene-sulphonamide | 4-Amino-1,1'-diphenylamine-2-sulphonic acid | 3-Aminobenzene-sulphonic acid | 1 |
| 21 | 1-Amino-2-hydroxybenzene-5-[N-(δ-hydroxybutyl)]sulphonamide | 4-Aminobenzene-sulphonamide | 4-Amino-1,1'-diphenylamine-2-sulphonic acid | 3-Aminobenzene-sulphonic acid | 1 |
| 22.1 and 22.2 | 1-Amino-2-hydroxybenzene-5-(N-methyl)sulphonamide | 4-Aminobenzene-(N,N-dimethyl)-sulphonamide | 4-Amino-1,1'-diphenylamine-2-sulphonic acid | 3-Aminobenzene-sulphonic acid | 1 and 2 |
| 22.3 and 22.8 | 1-Amino-2-hydroxybenzene-5-(N-methyl)sulphonamide | 4-Aminobenzene-(N,N-dimethyl)-sulphonamide | 4-Amino-1,1'-diphenylamine-2-sulphonic acid | — | 3, 4, 5, 6, 7 and 8 |
| 23.1 and 23.2 | 1-Amino-2-hydroxybenzene-5-(N-methyl)sulphonamide | 4-Aminobenzene-(N,N-diethyl)-sulphonamide | 4-Amino-1,1'-diphenylamine-2-sulphonic acid | 3-Aminobenzene-sulphonic acid | 1 and 2 |
| 23.3 and 23.8 | 1-Amino-2-hydroxybenzene-5-(N-methyl)sulphonamide | 4-Aminobenzene-(N,N-diethyl)-sulphonamide | 4-Amino-1,1'-diphenylamine-2-sulphonic acid | — | 3, 4, 5, 6, 7 and 8 |
| 24.1 and 24.2 | 1-Amino-2-hydroxybenzene-5-(N-methyl)sulphonamide | 3-Aminobenzene-sulphonamide | 4-Amino-1,1'-diphenylamine-2-sulphonic acid | 3-Aminobenzene-sulphonic acid | 1 and 2 |
| 24.3 to 24.8 | 1-Amino-2-hydroxybenzene-5-(N-methyl)sulphonamide | 3-Aminobenzene-sulphonamide | 4-Amino-1,1'-diphenylamine-2-sulphonic acid | — | 3, 4, 5, 6, 7 and 8 |
| 25.1 and 25.2 | 1-Amino-2-hydroxybenzene-5-(N-methyl)sulphonamide | 4-Aminobenzene-sulphonamide | 4-Amino-1,1'-diphenylamine-2-sulphonic acid | 4-Aminobenzene-sulphonic acid | 1 and 2 |
| 26.1 and 26.2 | 1-Amino-2-hydroxybenzene-5-(N-methyl)sulphonamide | 3-Aminobenzene-(N,N-diemthyl)-sulphonamide | 4-Amino-1,1'-diphenylamine-2-sulphonic acid | 3-Aminobenzene-sulphonic acid | 1 and 2 |
| 27.1 and 27.2 | 1-Amino-2-hydroxybenzene-5-(N-methyl)sulphonamide | 3-Aminobenzene-(N,N-diethyl)-sulphonamide | 4-Amino-1,1'-diphenylamine-2-sulphonic acid | 3-Aminobenzene-sulphonic acid | 1 and 2 |
| 28.1 and 28.2 | 1-Amino-2-hydroxybenzene-5-(N-methyl)sulphonamide | 4-Aminobenzene-sulphonamide | 4-Amino-2'-nitro-1,1'-diphenylamine-4'-sulphonic acid | 3-Aminobenzene-sulphonic acid | 1 and 2 |
| 28.3 to 28.8 | 1-Amino-2-hydroxybenzene-5-(N-methyl)sulphonamide | 4-Aminobenzene-sulphonamide | 4-Amino-2'-nitro-1,1'-diphenylamine-4'-sulphonic acid | — | 3, 4, 5, 6, 7 and 8 |
| 29.1 and 29.2 | 1-Amino-2-hydroxybenzene-5-(N-methyl)sulphonamide | 4-Aminobenzene-sulphonamide | 4-Amino-4'-nitro-1,1'-diphenylamine-2'-sulphonic acid | 3-Aminobenzene-sulphonic acid | 1 and 2 |
| 29.3 to 29.8 | 1-Amino-2-hydroxybenzene-5-(N-methyl)sulphonamide | 4-Aminobenzene-sulphonamide | 4-Amino-4'-nitro-1,1'-diphenylamine-2'-sulphonic acid | — | 3, 4, 5, 6, 7 and 8 |
| 30.1 and 30.2 | 1-Amino-2-hydroxybenzene-5-(N-methyl)sulphonamide | 1-Amino-2-hydroxybenzene-5-(N-methyl)sulphonamide | 4-Amino-4'-nitro-1,1'-diphenylamine-2'-sulphonic acid | — | 1 and 2 |
| 31.1 and 31.2 | 1-Amino-2-hydroxybenzene-5-sulphonamide | 1-Amino-2-hydroxybenzene-5-(N-phenyl)sulphonamide | 4-Amino-4'-nitro-1,1'-diphenylamine-2'-sulphonic acid | — | 1 and 2 |

APPLICATION EXAMPLE A (DRUM DYEING)

High affinity leather of 0.8 mm thickness (mastbox wet blue 0.8 mm) is washed in 300% water at 40° C. during 10 minutes and the water is drained off. In a fresh bath of 300% of water at 40° C., the pH of which is adjusted to 5 with 2.5% of sodium formate, the leather is treated during 15 minutes, then 1% of sodium bicarbonate are added and treatment is continued for 45 minutes and then the bath is drained off. The leather is washed with 300% water during 5 minutes and the bath is drained off. For retanning 150% water and 3% of a phenolic syntan (Tanigan 3 LN) are added and retanning is continued for 60 minutes at 40° C.; then the bath is drained off and the leather is fatted with 100% water and 6.5% of a fat-liquor (6% sulphited fish oil stabilized with 0.5% emulsifier) during 60 minutes at 50° C. The bath is drained off and the leather is washed with 300% water at 25° C. during 5 minutes. The leather is prepared by treatment with 1000% water at 50° C. during 30 minutes and is then dyed with 2.5% of the iron complex mixture dyestuff of Example 1 or 1bis under these conditions during 60 minutes. Afterwards, 2% of formic acid (of 85% concentration) are added and the treatment is continued for 45 minutes at 50° C. Finally, the leather is washed with 1000% of water at 25° C. during 5 minutes, then the bath is drained off, the leather is discharged and it is dried hanging and cured in the usual way. It is dyed in an intense, regular, yellowish-brown shade.

APPLICATION EXAMPLE B (DRUM DYEING)

High affinity leather of 0.8 mm thickness (mastbox wet blue 0.8 mm) is neutralized with 0.8% sodium bicarbonate in 250% water at 35° C. during 30 minutes. The leather is washed with 1000% water at 25° C. during 5 minutes reaching a pH 4.7-4.8. The bath is drained off and the leather is dyed in 250% water with 0.5% iron complex mixture dyestuff of Example 1 or 1bis at 55° C. during 20 minutes. 0.2% of formic acid (of 85% concentration) are added and the treatment is continued for 30 minutes. The bath is drained off and the leather is washed with 1000% water at 25° C. during 5 minutes. The leather is then fatted in a fresh bath with 3% of fat-liquor (1.4% sulphited fish oil and 1.4% of a mixture of sulphated fish train and fatty acid methyl esters, stabilized with 0.2% emulsifier) in 250% water at 50° C. during 60 minutes. Finally the leather is washed with 1000% water at 35° C. during 5 minutes. The bath is then drained off and the leather is discharged, dried hanging and cured in the usual way. It is dyed in a light, regular, yellowish-brown shade.

Analogously as the iron complex mixture dye of Example 1 each of the iron complex mixture dyes of Examples 2 to 8, 2bis to 8bis, 9 and 10.1 to 31.2 are employed in the above Application Examples A and B.

We claim:
1. A mixture of iron complexes of
    (i) at least one metallizable disazo compound of the formula

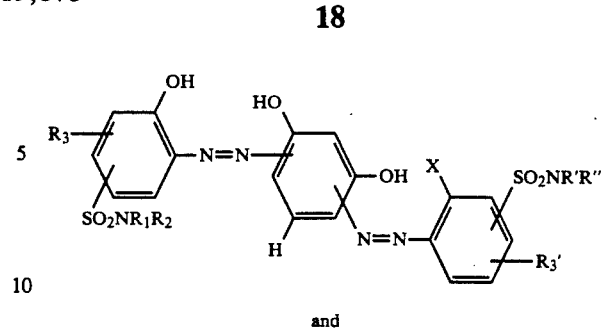

and (ii) at least one metallizable disazo compound of the formula

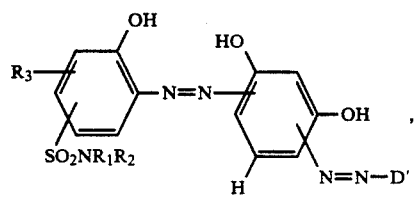

wherein
D' is a monocyclic or bicyclic aromatic diazo component radical of the benzene series containing one —SO$_3$M group,
R' is hydrogen, C$_{1-4}$alkyl, C$_{2-4}$hydroxyalkyl, methoxy

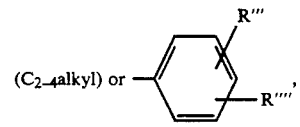

wherein
R''' is hydrogen, hydroxy, chloro, C$_{1-2}$alkyl, C$_{1-2}$alkoxy or —SO$_2$NR$_1$R$_2$, and
R'''' is hydrogen, C$_{1-2}$alkyl, C$_{1-2}$alkoxy, trifluoromethyl, —COOM or —NR$_o$'R$_o$'',
    wherein
    R$_o$' is hydrogen, C$_{1-4}$alkyl, C$_{2-4}$hydroxyalkyl, methoxy(C$_{2-4}$alkyl) or carbamoyl(C$_{1-4}$alkyl), and
    R$_o$'' is hydrogen, C$_{1-4}$alkyl, C$_{2-4}$hydroxyalkyl, methoxy(C$_{2-4}$alkyl) or carbamoyl(C$_{1-2}$alkyl), or
    —NR$_o$'R$_o$'' is a saturated nitrogen-containing 5- or 6-membered heterocyclic ring, and
R'' is hydrogen, C$_{1-4}$alkyl, C$_{2-4}$hydroxyalkyl or methoxy(C$_{2-4}$alkyl), or
—NR'R'' is saturated nitrogen-containing 5- or 6-membered heterocyclic ring,
R$_3$ is hydrogen, chloro or C$_{1-2}$alkyl,
R$_3$' is hydrogen, chloro or C$_{1-2}$alkyl, and
X is hydrogen or hydroxy,
wherein
each R$_1$ is independently hydrogen, C$_{1-4}$alkyl, C$_{2-4}$hydroxyalkyl or methoxy(C$_{2-4}$alkyl), and
each R$_2$ is independently hydrogen, C$_{1-4}$alkyl, C$_{2-4}$hydroxyalkyl or methoxy(C$_{2-4}$alkyl), or
—NR$_1$R$_2$ is a saturated nitrogen-containing 5- or 6-membered heterocyclic ring, and
each M is independently hydrogen or a cation.
2. A mixture of iron complexes according to claim 1 wherein each saturated nitrogen-containing 5- or 6-membered heterocyclic ring is independently pyrrolidino, morpholino or piperidino.

3. A mixture of iron complexes according to claim 2 wherein D' is

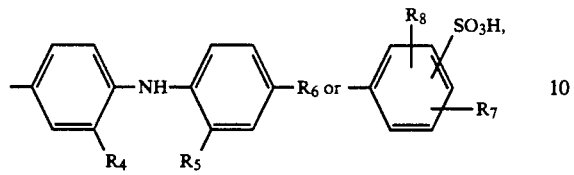

wherein $R_4$ is hydrogen, —$SO_3M$ or —$SO_2NR_1R_2$, $R_5$ is hydrogen, methoxy, nitro or —$SO_3M$, $R_6$ is hydrogen, methoxy, nitro or —$SO_3M$, with the provisos that at least one of $R_4$, $R_5$ and $R_6$ is hydrogen, and one of $R_4$, $R_5$ and $R_6$ is —$SO_3M$, $R_7$ is hydrogen, $C_{1-2}$alkyl, $C_{1-2}$alkoxy or nitro, and $R_8$ is hydrogen, chloro or $C_{1-2}$alkyl.

4. A mixture of iron complexes according to claim 3 wherein each M is independently hydrogen, lithium, sodium, potassium, magnesium, ammonium or substituted ammonium each substituent of which is selected from the group consisting of $C_{1-4}$alkyl and 2-hydroxy($C_{2-3}$alkyl).

5. A mixture of iron complexes according to claim 4 wherein each M is independently hydrogen, lithium, sodium, potassium, ammonium, ethanolammonium, diethanolammonium, triethanolammonium, isopropanolammonium, diisopropanolammonium or triisopropanolammonium.

6. A mixture of iron complexes according to claim 3 wherein (ii) comprises at least one metallizable disazo compound of the formula

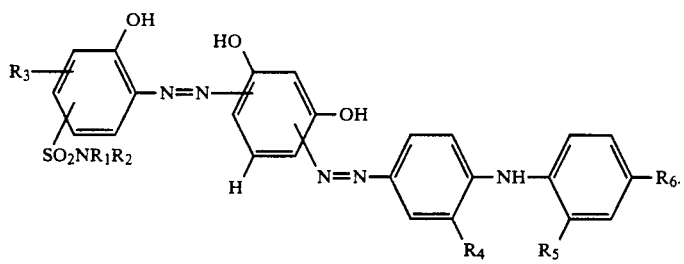

7. A mixture of iron complexes according to claim 6 wherein each M is independently hydrogen, lithium, sodium, potassium, ammonium, ethanolammonium, diethanolammonium, triethanolammonium, isopropanolammonium, diisopropanolammonium or triisopropanolammonium.

8. A mixture of iron complexes according to claim 7 wherein

R' is hydrogen, methyl, ethyl, 3-methoxypropyl, phenyl or phenyl monosubstituted by —COOM, R" is hydrogen, methyl or ethyl, each $R_1$ is independently hydrogen, methyl, ethyl or 3-methoxypropyl, each $R_2$ is independently hydrogen, methyl or ethyl, each —$SO_2NR_1R_2$ and —$SO_2NR'R"$ is independently meta or para to the azo radical attached to the ring to which it is attached, $R_4$ is hydrogen, and one of $R_5$ and $R_6$ is nitro and the other is —$SO_3M$, or $R_4$ is —$SO_3M$, and one of $R_5$ and $R_6$ is hydrogen and the other is hydrogen or methoxy, $R_7$ is hydrogen, methyl, methoxy or nitro, with the provisos that when $R_7$ is nitro, it is meta or para to the azo radical attached to the ring to which $R_7$ is attached and the —$SO_3M$ group attached to said ring is meta or para to $R_7$, and when $R_7$ is other than nitro, the —$SO_3M$ group attached to the ring to which $R_7$ is attached is meta or para to the azo radical attached to said ring, and $R_8$ is hydrogen, chloro or methyl.

9. A mixture of iron complexes according to claim 8 wherein

R' is hydrogen,

R" is hydrogen, $R_2$ is hydrogen, $R_3$ is hydrogen, $R_3'$ is hydrogen, $R_4$ is —$SO_3M$, $R_5$ is hydrogen, $R_6$ is hydrogen, $R_7$ is hydrogen, and $R_8$ is hydrogen.

10. A mixture of iron complexes according to claim 6 wherein (ii) further comprises at least one metallizable disazo compound of the formula

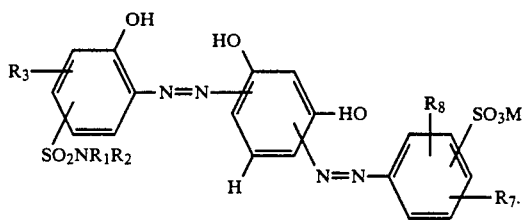

11. A mixture of iron complexes according to claim 10 wherein each M is independently hydrogen, lithium, sodium, potassium, ammonium, ethanolammonium, diethanolammonium, triethanolammonium, isopropanolammonium, diisopropanolammonium or triisopropanolammonium.

12. A mixture of iron complexes according to claim 11 wherein

R' is hydrogen, methyl, ethyl, 3-methoxypropyl, phenyl or phenyl monosubstituted by —COOM, R" is hydrogen, methyl or ethyl, each $R_1$ is independently hydrogen, methyl, ethyl or 3-methoxypropyl, each $R_2$ is independently hydrogen, methyl or ethyl, each —SO$_2$NR$_1$R$_2$ and —SO$_2$NR'R" is independently meta or para to the azo radical attached to the ring to which it is attached, R$_4$ is hydrogen, and one of R$_5$ and R$_6$ is nitro and the other is —SO$_3$M, or R$_4$ is —SO$_3$M, and one of R$_5$ and R$_6$ is hydrogen and the other is hydrogen or methoxy, R$_7$ is hydrogen, methyl, methoxy or nitro, with the provisos that when R$_7$ is nitro, it is meta or para to the azo radical attached to the ring to which R$_7$ is attached and the —SO$_3$M group attached to said ring is meta or para to R$_7$, and when R$_7$ is other than nitro, the —SO$_3$M group attached to the ring to which R$_7$ is attached is meta or para to the azo radical attached to said ring, and R$_8$ is hydrogen, chloro or methyl.

13. A mixture of iron complexes according to claim 12 wherein

R' is hydrogen,
R" is hydrogen,
R$_2$ is hydrogen,
R$_3$ is hydrogen,
R$_3$' is hydrogen,
R$_4$ is —SO$_3$M,
R$_5$ is hydrogen,
R$_6$ is hydrogen,
R$_7$ is hydrogen, and
R$_8$ is hydrogen.

14. A mixture of 1:2 iron complexes according to claim 6.

15. A process for dyeing a substrate dyeable with anionic dyes comprising applying to a substrate dyeable with anionic dyes a mixture of iron complexes according to claim 1.

16. A process according to claim 15 wherein the substrate is leather.

17. A compound of the formula

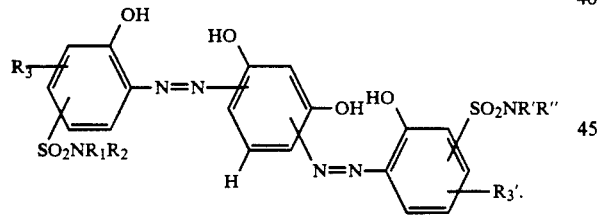

wherein

R' is hydrogen, C$_{1-4}$alkyl, C$_{2-4}$hydroxyalkyl, methoxy(C$_{2-4}$alkyl) or

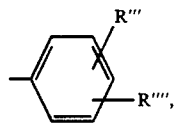

wherein

R'" is hydrogen, hydroxy, chloro, C$_{1-2}$alkyl, C$_{1-2}$alkoxy or —SO$_2$NR$_1$R$_2$, and R"" is hydrogen, C$_{1-2}$alkyl, C$_{1-2}$alkoxy, trifluoromethyl, —COOM or —NR$_o$'R$_o$", wherein R$_o$' is hydrogen, C$_{1-4}$alkyl, C$_{2-4}$hydroxyalkyl, methoxy(C$_{2-4}$alkyl) or carbamoyl(C$_{1-2}$alkyl), and R$_o$" is hydrogen, C$_{1-4}$alkyl, C$_{2-4}$hydroxyalkyl, methoxy(C$_{2-4}$alkyl) or carbamoyl(C$_{1-2}$alkyl), or —NR$_o$'R$_o$" is saturated nitrogen-containing 5- or 6-membered heterocyclic ring, and M is hydrogen or a cation, R" is hydrogen, C$_{1-4}$alkyl, C$_{2-4}$hydroxyalkyl or methoxy(C$_{2-4}$alkyl), or —NR'R" is a saturated nitrogen-containing 5- or 6-membered heterocyclic ring, R$_3$ is hydrogen, chloro or C$_{1-2}$alkyl, and R$_3$' is hydrogen, chloro or C$_{1-2}$alkyl, wherein each R$_1$ is independently hydrogen, C$_{1-4}$alkyl, C$_{2-4}$hydroxyalkyl or methoxy(C$_{2-4}$alkyl), and each R$_2$ is independently hydrogen, C$_{1-4}$alkyl, C$_{2-4}$hydroxyalkyl or methoxy(C$_{2-4}$alkyl), or —NR$_1$R$_2$ is a saturated nitrogen-containing 5-or 6-membered heterocyclic ring.

18. A compound according to claim 17 wherein each saturated nitrogen-containing 5- or 6-membered heterocyclic ring is independently pyrrolidino, morpholino or piperidino, and M is hydrogen, lithium, sodium, potassium, ammonium, ethanolammonium, diethanolammonium, triethanolammonium, isopropanolammonium, diisopropanolammonium or triisopropanolammonium.

19. An iron complex of a metallizable disazo compound of the formula

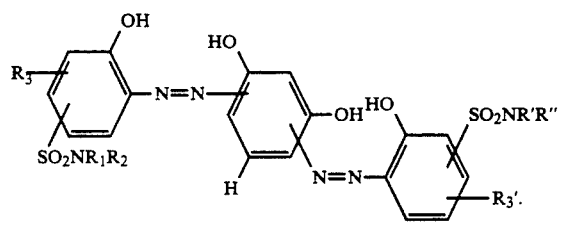

or a mixture thereof, wherein

R' is hydrogen, C$_{1-4}$alkyl, C$_{2-4}$hydroxyalkyl, methoxy(C$_{2-4}$alkyl) or

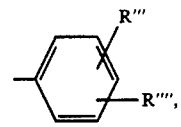

wherein

R'" is hydrogen, hydroxy, chloro, C$_{1-2}$alkyl, C$_{1-2}$alkoxy or —SO$_2$NR$_1$R$_2$, and R"" is hydrogen, C$_{1-2}$alkyl, C$_{1-2}$alkoxy, trifluoromethyl, —COOM or —NR$_o$'R$_o$", wherein R$_o$' is hydrogen, C$_{1-4}$alkyl, C$_{2-4}$hydroxyalkyl, methoxy(C$_{2-4}$alkyl) or carbamoyl(C$_{1-2}$alkyl), and R$_o$' is hydrogen, C$_{1-4}$alkyl, C$_{2-4}$hydroxyalkyl, methoxy(C$_{2-4}$alkyl) or carbamoyl(C$_{1-2}$alkyl), or —NR$_o$'R$_o$" is a saturated nitrogen-containing 5- or 6-membered heterocyclic ring, M is hydrogen or a cation, R" is hydrogen, C$_{1-4}$alkyl, C$_{2-4}$hydroxyalkyl or methoxy(C$_{2-4}$alkyl), or —NR'R'' is a saturated nitrogen-containing 5- or 6-membered heterocyclic ring, $R_3$ is hydrogen, chloro or $C_{1-2}$alkyl, and $R_3'$ is hydrogen, chloro or $C_{1-2}$alkyl, wherein each $R_1$ is independently hydrogen, $C_{1-4}$alkyl, $C_{2-4}$-hydroxyalkyl or methoxy($C_{2-4}$alkyl), and each $R_2$ is independently hydrogen, $C_{1-4}$alkyl, $C_{2-4}$-hydroxyalkyl or methoxy($C_{2-4}$alkyl), or —$NR_1R_2$ is a saturated nitrogen-containing 5- or 6-membered heterocyclic ring.

20. An iron complex according to claim 19 wherein each saturated nitrogen-containing 5- or 6-membered heterocyclic ring is independently pyrrolidino, morpholino or piperidino, and M is hydrogen, lithium, sodium, potassium, ammonium, ethanolammonium, diethanolammonium, triethanolammonium, isopropanolammonium, diisopropanolammonium or triisopropanolammonium.

* * * * *